(12) United States Patent
Lootens et al.

(10) Patent No.: US 11,511,478 B2
(45) Date of Patent: Nov. 29, 2022

(54) ADDITIVE MANUFACTURING OF SHAPED BODIES FROM CURABLE MATERIALS

(71) Applicant: SIKA TECHNOLOGY AG, Baar (CH)

(72) Inventors: Didier Lootens, Küsnacht (CH); Armin Brühwiler, Bütschweil (CH); Raphael Bourquin, Neerach (CH)

(73) Assignee: SIKA TECHNOLOGY AG, Baar (CH)

( * ) Notice: Subject to any disclaimer, the term of this patent is extended or adjusted under 35 U.S.C. 154(b) by 374 days.

(21) Appl. No.: 16/465,167

(22) PCT Filed: Dec. 20, 2017

(86) PCT No.: PCT/EP2017/083895
§ 371 (c)(1),
(2) Date: May 30, 2019

(87) PCT Pub. No.: WO2018/115166
PCT Pub. Date: Jun. 28, 2018

(65) Prior Publication Data
US 2020/0001520 A1    Jan. 2, 2020

(51) Int. Cl.
*B29C 64/106*    (2017.01)
*B29C 64/386*    (2017.01)
(Continued)

(52) U.S. Cl.
CPC .......... *B29C 64/106* (2017.08); *B29C 64/386* (2017.08); *E04G 21/04* (2013.01); *B33Y 50/02* (2014.12); *B33Y 80/00* (2014.12)

(58) Field of Classification Search
CPC ...... B28B 1/001; B29C 64/106; B29C 64/112; B29C 64/386; B29C 64/393; B33Y 10/00; B33Y 50/02; B33Y 80/00
See application file for complete search history.

(56) References Cited

U.S. PATENT DOCUMENTS

| 4,264,368 A * | 4/1981 | Schutz ................. C04B 24/06 106/727 |
| 2009/0101278 A1 * | 4/2009 | Laberge-Lebel ...... B29C 64/106 156/275.5 |

(Continued)

FOREIGN PATENT DOCUMENTS

| EP | 1348729 A1 | 10/2003 |
| EP | 1138697 B1 | 11/2003 |

(Continued)

OTHER PUBLICATIONS

Jun. 25, 2019 International Preliminary Report on Patentability issued in International Patent Application No. PCT/EP2017/083895.

(Continued)

*Primary Examiner* — Michael P Wieczorek
(74) *Attorney, Agent, or Firm* — Oliff PLC

(57) ABSTRACT

A method for producing a shaped body from a curable material, in particular from a mineral binder composition, wherein the curable material is applied layer by layer in an additive method, in particular in an additive free-space method, by a printing head that can be moved in at least one spatial direction and wherein an application rate of the curable material and the temporal development of strength of the curable material are coordinated with each other.

17 Claims, 2 Drawing Sheets

(51) Int. Cl.
*B33Y 50/02* (2015.01)
*E04G 21/04* (2006.01)
*B33Y 80/00* (2015.01)

(56) References Cited

U.S. PATENT DOCUMENTS

| | | | |
|---|---|---|---|
| 2014/0252668 A1* | 9/2014 | Austin | B28B 3/20 |
| | | | 264/40.7 |
| 2014/0284832 A1 | 9/2014 | Novikov et al. | |
| 2015/0072068 A1* | 3/2015 | Bowers | C04B 40/0028 |
| | | | 427/8 |
| 2016/0107332 A1 | 4/2016 | Grivetti | |

FOREIGN PATENT DOCUMENTS

| | | |
|---|---|---|
| EP | 1061089 B1 | 3/2004 |
| EP | 2468696 A1 | 6/2012 |
| EP | 2522680 A1 | 11/2012 |
| JP | 2002-340864 A | 11/2002 |
| JP | 2004-231497 A | 8/2004 |
| JP | 2009-178225 A | 8/2009 |
| JP | 2015-502870 A | 1/2015 |
| JP | 2017-185645 A | 10/2017 |
| RU | 2270091 C2 | 2/2006 |
| RU | 2304507 C2 | 8/2007 |
| RU | 2380336 C2 | 1/2010 |
| WO | 2004/065707 A2 | 8/2004 |
| WO | 2013/064826 A1 | 5/2013 |
| WO | 2014/121917 A1 | 8/2014 |
| WO | 2015/059956 A1 | 4/2015 |
| WO | 2016/095888 A1 | 6/2016 |

OTHER PUBLICATIONS

May 25, 2020 Office Action issued in European Patent Application No. 17818572.4.
Jun. 2, 2020 Office Action issued in Singaporean Patent Application No. 11201904562S.
Feb. 23, 2018 International Search Report issued in International Patent Application No. PCT/EP2017/083895.
Oblak et al. "Kontinuierliche Messung Der Festigkeitsentwicklung Von Spritzbeton [Continuous Measurement of the Strength Development of Shotcrete]". Shotcrete Conference, 2012, publisher: Prof. Wolfgang Kusterle, pp. 22-23.
Wangler et al., "Digital Concrete: Opportunities and Challenges," RILEM Technical Letters, vol. 1, pp. 67-75, Oct. 31, 2016.
"Cement Hydration: The Basics," Technical Summary, IMCP Manual, pp. 1-4, Aug. 2007.

* cited by examiner

ADDITIVE MANUFACTURING OF SHAPED BODIES FROM CURABLE MATERIALS

TECHNICAL FIELD

The invention relates to a method for producing a shaped body from a curable material, in particular from a mineral binder composition, wherein the curable material is applied in layers in an additive method, in particular an additive free-space method, by means of a print head that is moveable in at least one spatial direction. A further aspect of the invention relates to a device for additive manufacturing of a shaped body from a curable material and to the use of such a device for producing shaped bodies from mineral binders or mineral binder compositions, in particular concrete and/or mortar compositions.

PRIOR ART

The production of shaped bodies by additive manufacturing methods is becoming increasingly important in all fields of technology. The term "additive manufacturing method" or "additive manufacturing" refers to methods in which a three-dimensional object or a shaped body is produced by selective three-dimensional deposition, application and/or solidification of material.

In this process, the deposition, application and/or solidification of the material takes place in particular based on a data model of the object to be produced, and in particular in layers or sheets. In the additive manufacturing method, each object is typically produced from one or a plurality of sheets. Ordinarily, an object is manufactured using a shapeless material (e.g. liquids, powders, granules, etc.) and/or a shape-neutral material (e.g. bands, wires) that in particular is subjected to chemical and/or physical processes (e.g. melting, polymerization, sintering or curing). Additive manufacturing methods are also referred to using terms such as "generative manufacturing methods", "additive manufacturing" or "3D printing."

For example, WO 2016/095888 A1 (Voxeljet AG) describes a method for producing three-dimensional molded parts by means of layering technology. The molded parts can be used for example as casting molds, in particular for concrete or polymer casting processes, or as sculptures or built-in component parts. Particulate build material is applied using a coater in a specified layer thickness to a building field, and binder fluid is selectively applied to the build material via a print head, wherein the binder fluid is polymerized by means of an activator added to the particles. The building field is then lowered by one layer thickness or the coater is raised by one layer thickness, and further layers are produced in the same manner until the desired molded part is produced. Although such powder-bed-based printing methods are suitable for certain applications, they are often relatively expensive and limited to special materials.

In the construction field, efforts have also been under way for some time to produce geometrically sophisticated components such as e.g. concrete elements by means of additive methods. This is indeed possible to a certain extent. However, the physical and chemical properties of concrete mixtures make the additive manufacturing of shaped bodies from concrete extremely difficult. In particular, due to kinetics during the curing process and the thixotropic properties of the concrete compositions, the production speed of concrete elements using additive manufacturing methods is sharply limited.

There is therefore a continuing need for new and improved solutions that overcome the above-mentioned drawbacks to the extent possible.

DESCRIPTION OF THE INVENTION

The object of the present invention is therefore to provide improved methods for the selective production of shaped bodies. In particular, these methods are designed to allow production that is efficient, reliable, and as rapid as possible of shaped bodies from curable materials, in particular from mineral binder compositions. To the extent possible, this should be carried out without adversely affecting the quality or strength of the shaped bodies. In addition, corresponding devices are to be provided that effectively allow these objectives to be achieved.

Surprisingly, it was found that with respect to the methods, the object of the invention can be achieved by means of a method for producing a shaped body from a curable material as claimed in claim 1.

The solution accordingly consists of a method for producing a shaped body from a curable material, in particular from a mineral binder composition, wherein the curable material is applied in layers in an additive method, in particular an additive free-space method, by means of a print head that is moveable in at least one spatial direction and wherein an application rate of the curable material and the temporal strength development of the curable material are coordinated with each other.

It has been found that by means of the method according to the invention, it is possible to produce shaped bodies from curable materials in a reliable manner and in a minimal period of time. Moreover, the method is universally applicable, and if needed, can be carried out with a wide variety of curable materials, e.g. duroplastics or mineral binder compositions.

Surprisingly, it was also found that by means of the method according to the invention, the quality of the shaped bodies produced can be improved in many cases. Without being bound by a theory, it is assumed that this is attributable to the coordination according to the invention of the application rate and the temporal strength development of the curable material. In particular, this allows the strength and quality of the shaped body to be improved as a whole.

The coordination according to the invention or synchronization of the application rate and the temporal strength development also allows the most rapid production possible of the shaped body. The reason is that one can dispense with unnecessarily long waiting times in application of successive layers. In conventional systems, a waiting time is typically planned after each layer before the next layer is applied, or a reduced application rate must be selected. In this case, the waiting time or the reduction in the application rate must be considerable, and sufficient safety margins must be included therein, as the temporal strength development of the curable material, which depends on environmental conditions, is not taken into account. Otherwise, there is in particular a risk that the lower layers of the shaped body will undergo deformation under the load of the layers applied thereabove. This leads on the one hand to dead time, which slows the methods, and on the other hand increases the risk that the strength or quality of the shaped body will be reduced. In contrast, the dead time associated with conventional methods can be eliminated by means of the coordination according to the invention without running the risk of deformation of the layers or of adversely affecting the adhesion between adjacent layers.

Further aspects of the invention are the subject matter of further independent claims. Particularly preferred embodiments of the invention are the subject matter of the dependent claims.

Description of the Preferred Embodiments

In a first aspect, the invention relates to a method for producing a shaped body from a curable material, in particular from a mineral binder composition, wherein the curable material is applied in layers in an additive method, in particular an additive free-space method, by means of a print head that is moveable in at least one spatial direction and wherein an application rate of the curable material and the temporal strength development of the curable material are coordinated with each other.

In particular, in the additive method, an individual layer is built up by selective deposition, placement or application of curable material, after which the next layer is applied in the same manner to the layer thus produced. This process is repeated until construction of the shaped body is completed.

The term "application rate" is to be understood herein as referring to the height of the curable material applied per unit time. The height is typically measured in a direction that is essentially perpendicular to the planes formed by individual layers. In particular, the height is measured in the vertical direction.

A height of an individual layer is in particular 0.1-10 cm, preferably 0.5-5 cm or 1-2 cm. A total height of the shaped body or the thickness of all individual layers of the shaped body taken together is for example 1 cm-1000 cm, preferably 10 cm-500 cm, and in particular 50 cm-300 cm or 100 cm-200 cm. This applies in particular when the curable material comprises or consists of a mineral binder composition, in particular a mortar or concrete composition.

"Temporal strength development of the curable material" is to be understood herein as referring to the strength development of the curable material specifically used in the method, and in particular under the present environmental conditions. The temporal strength development of the curable material is determined in particular for a period of 0.1-1000 min, preferably 0.1-100 min and particularly preferably 0.1-10 min after the exit of the curable material from the print head. The strength values determined in this process correspond in particular to the strength, in particular the compressive strength, of the curable material at specified points in time after the mixing of the curable material and/or after the exit of the curable material from the print head. The specified points in time are in particular in a range of 0.1-1000 min, preferably 0.1-100 min and particularly preferably 0.1-10 min after the mixing of the curable material and/or the exit of the curable material from the print head.

A "curable material" denotes a material that is typically flowable or liquefiable, and after mixing, for example by adding mixing water, mixing in components, or heating, can undergo a chemical reaction to harden into a solid. For example, the curable material can be reaction resins, mineral binders, mineral binder compositions or mixtures thereof.

Reaction resins are in particular liquid or liquefiable synthetic resins that harden into duromers by polymerization or polyaddition. For example, unsaturated polyester resins, vinyl ester resins, acrylic resins, epoxy resins, polyurethane resins and/or silicone resins can be used.

The term "mineral binder" is to be understood in particular as referring to a binder that undergoes a hydration reaction in the presence of water to form solid hydrates or hydrate phases. This can for example be a hydraulic binder (e.g. cement or hydraulic lime), a latent hydraulic binder (e.g. slag), a pozzolanic binder (e.g. fly ash) or a non-hydraulic binder (e.g. gypsum or calcium lime).

Accordingly, a "mineral binder composition" is a composition comprising at least one mineral binder. In the present case, this comprises in particular the binder, aggregates and optionally one or a plurality of admixtures. Examples of suitable aggregates include rock particles, gravel, sand (in natural and/or processed (e.g. crushed) form) and/or fillers. The mineral binder composition is in particular in the form of a liquid binder composition mixed with mixing water.

A "cementitious binder" or a "cementitious binder composition" is understood herein to refer in particular to a binder or a binder composition with a content of at least 5 wt %, in particular at least 20 wt %, preferably at least 35 wt % and in particular at least 65 wt % of cement clinker. The cement clinker is preferably a Portland cement clinker and/or a calcium sulfoaluminate cement clinker, in particular a Portland cement clinker. In the present context, cement clinker refers in particular to ground cement clinker.

In particular, the mineral binder or the binder composition comprises a hydraulic binder, preferably cement. Particularly preferred is a cement with a cement clinker content of ≥35 wt %, in particular a cement of type CEM I, II, III, IV or V, and preferably cement of type CEM I (according to the standard EN 197-1). A content of the hydraulic binder in the mineral binder as a whole is advantageously at least 5 wt %, in particular at least 20 wt %, preferably at least 35 wt % and in particular at least 65 wt %. According to a further advantageous embodiment, the mineral binder consists to at least 95 wt % of a hydraulic binder, in particular cement clinker.

However, it can also be advantageous if the binder composition contains other binders in addition to or instead of a hydraulic binder. These are in particular latent hydraulic binders and/or pozzolanic binders. Suitable latent hydraulic and/or pozzolanic binders are e.g. slag, foundry sand, fly ash and/or silica fume. The binder composition can also comprise inert substances such as e.g. limestone powder, quartz powder and/or pigments. In an advantageous embodiment, the mineral binder comprises 5-95 wt %, in particular 5-65 wt % and in particular 15-35 wt % of latent hydraulic and/or pozzolanic binders.

The shaped body produced by the method according to the invention can be of virtually any desired form, for example it may be a finished part for a structure, e.g. for a building, a masonry structure and/or a bridge.

Advantageous embodiments of the print head and further features pertaining to the device that are particularly well-suited for the method according to the invention are described below in connection with the second aspect of the present invention.

In particular, the method according to the invention is an additive free space method. This means that the shaped body is formed in layers, specifically in that curable material is applied only at the sites where the shaped body is to be formed. In the case of overhangs and/or hollow spaces, a supporting structure can optionally be provided. In contrast to this, for example in powder bed methods or liquid phase methods, the entire build space is typically filled, and solidification of the material is then selectively carried out at the desired sites.

In the present case, free space methods have been found to be particularly advantageous in connection with the production of shaped bodies from curable materials.

According to a preferred embodiment, the application rate of the curable material is set depending on, in particular proportionally to, the strength of the curable material at a specified point in time after mixing of the curable material and/or after the exit of the curable material from the print head. This means that the application rate is directly coordinated with the strength of the curable material that is achievable at a specified point in time. The temporal strength development of the curable material can remain unchanged. The greater the strength of the curable material at the specified point in time, the greater the application rate that can be selected, and the more quickly the shaped body can be produced.

However, it can also be preferable for the strength of the curable material at the specified point in time to be set depending on, in particular proportionally to, a predetermined application rate. In this case, the application rate can remain unchanged or constant. The higher the desired application rate in this case, the higher the temporal strength development of the curable material must be set.

It can also be advantageous if at the same time both the strength of the curable material at the specified point in time and the application rate are set and coordinated with each other.

According to a further advantageous embodiment, the application rate of the curable material can be changed as the number of layers increases, for example increased, in particular proportionally to the number of layers. As layers at higher levels bear less weight during curing than layers lying thereunder, lower strengths are required at higher levels. Accordingly, by increasing the application rate, it is possible in certain cases to further increase the speed of production of the shaped body.

In principle, however, it is also possible to set the application rate independently of the number of layers.

Further preferably, a waiting time is observed between the application of two successive layers of curable material, wherein the waiting time is selected depending on the temporal strength development of the curable material. The waiting time is in particular between 0.1 min and 10 min, in particular between 1 min and 10 min, and in particular between 10 min and 20 min.

The observation of a waiting time makes it possible to adapt the build rate to the temporal strength development of the curable material and at the same time to keep the movement speed of the print head constant, or to set said speed with respect to the most suitable application of the curable material possible, in particular independently of the build rate.

In particular, the waiting time is selected so as to depend on the position of the layer to be applied with respect to the layers already applied. Preferably, the waiting time is determined in consideration of the geometry of the shaped body to be produced. For example, the waiting time can decrease as the number of layers increases, in particular proportionally to the number of layers. This can be advantageous for example if the walls of the shaped body extend vertically.

It can also be advantageous if a movement speed of the print head is set depending on the temporal strength development of the curable material. This makes it possible, for example, to move the print head at a speed that allows essentially continuous application of the curable material. If desired, this can make it possible to reduce or completely eliminate waiting times between the application of adjacent layers. This can for example be advantageous in order to achieve the most constant volume flow rate possible of the curable material from the print head, which in some cases has a favorable effect on the adhesion between adjacent layers and/or the overall quality of the shaped body produced.

In a preferred embodiment, the movement speed of the print head is set depending on, in particular proportionally to, a length of a distance the print head has to travel in a current layer of the shaped body with release of curable material. For example, if adjacent layers comprise distances of different lengths, a constant application rate can thus be effectively achieved. In this case, layers with short distances to be traveled are applied with a slowly moving print head, while layers with long distances to be traveled are produced using a more quickly moving print head. However, the time required for the production of an individual layer can e.g. be kept constant.

In principle, however, the print head can also be moved independently of the length of the distance the print head has to travel in a current layer of the shaped body with release of curable material. This can for example be advantageous if it is desired to achieve the most constant volume flow rate possible in outputting the curable material from the print head.

In an advantageous embodiment, the movement speed is selected so that it depends on the position of the layer to be applied with respect to the layers that have already been applied. Preferably, the movement speed is determined in consideration of the geometry of the shaped body to be produced. For example, the movement speed can increase as the number of layers increases, in particular proportionally. This can be advantageous for example if the walls of the shaped body extend vertically.

The volume flow rate of the curable material exiting the print head is in particular selected depending on, in particular proportionally to, the movement speed of the print head.

In particular, the temporal strength development of the curable material is determined before and/or during the additive manufacturing of the shaped body based on the curable material specifically used.

The temporal strength development of the curable material is measured in particular during the additive manufacturing of the shaped body, in particular several times and/or at regular intervals. This makes it possible for example to adapt the application rate and/or the temporal strength development of the curable material during application. For example, this allows fluctuations in the composition of the curable material and changes in the temporal strength development connected therewith to be corrected or compensated for.

For example, the temporal strength development of the curable material can be measured after application of a layer has been carried out and/or prior to application of a following layer.

The temporal strength development is determined in particular by measurement at least one time, in particular multiple times, of a physical quantity of the curable material. The measurement of the physical quantity of the curable material takes place for example at at least one specified point in time, advantageously at a plurality of specified points in time, after mixing of the curable material and/or after the exit of the curable material from the print head.

In order to determine the strength development, the measured physical quantity can for example be converted by means of advance calibration into a strength value.

In particular, by measurement of the physical quantity, one can for example determine a set point in time at which a predetermined set value is reached for the respective physical quantity.

The movement speed of the print head, the waiting time and/or the application rate can then be set as a function of the set point in time. For example, this can be carried out as follows:

a) the movement speed is set inversely proportionally to the set point in time and/or
b) the waiting time is set proportionally to the set point in time and/or c) the application rate is set inversely proportionally to the set point in time.

The proportionality factors can be determined in advance by calibration in a manner known per se.

This makes it possible to carry out reliable adaptation to the specific strength development of the curable material.

For example, however, it is also possible to determine an actual value of the measured physical quantity by measuring the physical quantity at a predetermined reference point in time.

The movement speed of the print head, the waiting time and/or the application rate can then be set as a function of the actual value of the measured physical quantity. For example, this can be carried out as follows:

a) the movement speed is set proportionally to the actual value of the measured physical quantity and/or
b) the waiting time is set inversely proportionally to the actual value of the measured physical quantity and/or
c) the application rate is set proportionally to the actual value of the measured physical quantity.

In principle, however, other dependencies between the set point in time and/or the actual value of the measured physical quantity and the movement speed of the print head, the waiting time and/or the application rate can also be provided.

In the present case, it is particularly advantageous when as a physical quantity, the temperature, the electrical conductivity, the penetration force of a specified object with a predetermined penetration depth, the penetration depth of a specified object with a predetermined penetration force and/or the reflection of sound waves, in particular ultrasound waves, is measured on the curable material.

Based on the above-mentioned quantities, a reliable conclusion can be drawn as to the strength development of the curable material. In principle, however, other quantities can also be determined that are connected with the strength development.

The penetration force of a specified object with a predetermined penetration depth or the penetration depth of a specified object with a predetermined penetration force is preferably determined by means of a penetration needle method, wherein a needle is typically used as the specified object. Such methods are known per se to the person skilled in the art. Further information on this can also be found in the publication "Kontinuierliche Messung der Festigkeitsentwicklung von Spritzbeton" ["Continuous measurement of the strength development of shotcrete"] by Oblak et al., Shotcrete Conference 2012 (publisher: Prof. Wolfgang Kusterle) in chapter 1.

The measurement principle of ultrasound measurement is based on the theory of sound propagation in matter and the correlation with the mechanical properties thereof. When a transverse wave impinges on a viscoelastic material, its amplitude is significantly attenuated, and a portion of the wave is reflected. This reflection is detected by the measurement sensor. With increasing curing of the material, the amplitude reduction becomes increasingly pronounced. From the relative decrease in amplitude, one can then determine the shear modulus, which in turn is a measure of the strength of the curable material.

For ultrasound measurements, measurement sensors are preferably used that generate ultrasound pulses in the range of 0.1 to 10 MHz. Depending on whether the compression or shear modulus is to be measured, longitudinal or transverse waves are emitted. In particular, the ultrasound signal is guided by a specified waveguide to the interface with the sample, by which it is partially reflected again, and the second part of the original wave is then additionally reflected at the interface between the sample and the air. This then allows measurement and evaluation of the amplitude and/or the duration of the wave generation until detection of the first reflection occurring at the interface between the waveguide and the sample. This amplitude and duration depend on the mechanical properties of the sample. As the propagation speed of the wave through the waveguide strongly depends on the temperature of the waveguide, the temperature is preferably measured and taken into consideration in the evaluation. Further details on ultrasound measurement can also be found in the publication "Kontinuierliche Messung der Festigkeitsentwicklung von Spritzbeton" ["Continuous measurement of the strength development of shotcrete"] by Oblak et al., Shotcrete Conference 2012 (publisher: Prof. Wolfgang Kusterle) in chapter 3. These interrelationships are known per se to the person skilled in the art in the field of shotcrete. Surprisingly, however, it has been found that they can also be used in connection with additive manufacturing.

Particularly preferably, the strength development of the curable material is determined in the present case by means of a penetration needle process and/or by sound measurement, in particular ultrasound measurement.

It is further advantageous for the curable material to be treated with an agent that accelerates the curing and/or an agent that retards the curing. In particular, an accelerating substance ("curing accelerator") and/or a retardant substance ("curing retardant") is admixed with the curable material. This is advantageously carried out in the area of the print head, in particular immediately prior to the exit of the curable material from the print head to the extent possible.

This makes it possible to selectively set the temporal strength development of the curable material. In particular, by adding a curing accelerator, the production process of the shaped body as a whole can be sharply accelerated. This also allows the temporal strength development to be adapted without having to change other method parameters.

Numerous substances known to the person skilled in the art can be used as curing accelerators.

In particular, if the curable material is a mineral binder or a mineral binder composition, the curing accelerator preferably comprises one or a plurality of the following representative substances:

a) one or a plurality of amino alcohols and/or salts thereof
b) one or a plurality of alkali and/or alkaline earth nitrates
c) one or a plurality of alkali and/or alkaline earth nitrites
d) one or a plurality of alkali and/or alkaline earth thiocyanates
e) one or a plurality of alkali and/or alkaline earth halides
f) one or a plurality of alkali and/or alkaline earth carbonates
g) glycerol and/or glycerol derivatives
h) one or a plurality of glycols and/or glycol derivatives
i) one or a plurality of aluminum salts and/or aluminum hydroxides
j) one or a plurality of alkali and/or alkaline earth hydroxides
k) one or a plurality of alkali and/or alkaline earth silicates
l) one or a plurality of alkali or alkaline earth oxides
m) crystallization seeds, in particular calcium silicate hydrate compounds in fine particulate form.

This makes it possible, for example, to carry out flexible adaptation to a wide variety of applications.

Curing retardants are selected for example from the list comprising hydroxycarboxylic acids, saccharose and/or phosphates. This applies in particular if the curable material is a mineral binder or a mineral binder composition.

In particular, the curable material comprises a mineral binder composition, in particular a hydraulic binder composition, preferably a mortar or concrete composition, or consists thereof. In particular, the mineral binder composition is composed as described above.

The mineral binder composition can optionally comprise at least one admixture, for example a concrete admixture and/or a mortar admixture and/or process chemicals. The at least one admixture comprises in particular a defoaming agent, a dye, a preservative, a plasticizer, a retarder, an accelerator, an air-entraining agent, a rheological aid, a shrinkage reducer and/or a corrosion inhibitor or combinations thereof.

A mineral binder composition is advantageously used together with or comprises a plasticizer or liquefier. Examples of suitable plasticizers include lignosulfonates, sulfonated naphthalene formaldehyde condensates, sulfonated melamine formaldehyde condensates, sulfonated vinyl copolymers, polyalkylene glycols with phosphonate groups, polyalkylene glycols with phosphate groups, polycarboxylates, and comb polymers with polyalkylene oxide side chains and anionic groups in the polymer backbone, wherein the anionic groups in particular are selected from carboxylate groups, sulfonate groups, phosphonate groups or phosphate groups, or mixtures of the aforementioned plasticizers.

The plasticizer comprises in particular a polycarboxylate, in particular a polycarboxylate ether. In particular, the plasticizer is a comb polymer comprising a polycarboxylate backbone with polyalkylene oxide side chains attached thereto, in particular polyethylene oxide side chains. The side chains are in particular bonded to the polycarboxylate backbone via ester, ether, imide and/or amide groups.

Advantageous plasticizers are e.g. copolymers of (meth) acrylic acid and/or maleic acid monomers and macromonomers selected from polyalkylene glycol vinyl ethers (VPEG), polyalkylene glycol allyl ethers (APEG), polyalkylene glycol methallyl ethers (HPEG), or polyalkylene glycol isoprenyl ethers (TPEG or IPEG). Particularly suitable are e.g. copolymers of maleic acid or derivatives thereof, allyl ethers, in particular polyethylene glycol allyl ethers, and vinyl acetate. Corresponding copolymers and the production thereof are described for example in EP 2468696 A1 (Sika Technology AG). Particularly suitable are e.g. the copolymers P-1 to P-4 as described in paragraphs 0058 to 0061 and Table 1 of EP 2468696 A1.

Also suitable are for example copolymers of maleic acid or derivatives thereof, allyl ethers, in particular polyethylene glycol allyl ethers, and (meth)acrylic acid. Such copolymers and the production thereof are described in EP 2522680 A1 (Sika Technology AG). Advantageous are e.g. the copolymers P-1 to P-6 as described in paragraphs 0063 to 0070 and Table 1 of EP 2522680 A1.

Furthermore suitable polycarboxylate ethers and production methods are disclosed for example in EP 1138697 B1 on p. 7, line 20 to p. 8, line 50 and the examples thereof or in EP 1061089 B1 on p. 4, line 54 to p. 5, line 38 and the examples thereof. In a special embodiment thereof, as described in EP 1348729 A1 on p. 3 to p. 5 and the examples thereof, the comb polymer can be produced in a solid aggregate state.

The disclosures of the patents mentioned in connection with the plasticizers are incorporated hereby in particular by reference.

Corresponding comb polymers are also commercially distributed by Sika Schweiz AG under the trade name series ViscoCrete®.

A second aspect of the present invention relates to a device for additive manufacturing of a shaped body from a curable material, in particular for carrying out a method as described above. The device comprises a print head that is moveable in at least one spatial direction with which the curable material can be applied in layers at predetermined sites, and a control unit with which the print head can be controlled. The control unit is configured such that the temporal strength development can be determined and an application rate of the curable material and the temporal strength development of the curable material can be coordinated with each other.

The determination of the temporal strength development in the control unit can in particular be carried out manually, e.g. by manually inputting a corresponding value, or automatically, for example by reading out of a suitable measuring device.

If the temporal strength development takes place based on measurement of a physical quantity of the curable material, determination of the temporal strength development in the control unit can also include conversion of the physical quantity into the temporal strength development. For example, this can be carried out by conversion using previously determined calibration data, in particular calibration data stored in a memory area of the control unit.

The control unit is provided in particular with a memory unit in which one or a plurality of determined temporal strength development values and/or calibration data can be stored. In particular, the control unit is also provided with a calculation and output unit that is configured to generate control signals for the print head based on the determined strength development values.

In a particularly preferred embodiment, the device according to the invention also comprises a measuring unit with which the temporal strength development and/or a physical quantity of the curable material can be measured. The physical quantity is defined as described above in connection with the method.

The measuring unit is in particular configured such that a sample of the curable material can be placed in the measuring unit via the print head, and time-dependent measurement of a physical quantity and/or the strength can then be carried out.

In particular, the measuring unit is a measuring unit for measuring the temperature, the electrical conductivity, the penetration force of a specified object with a predetermined penetration depth, the penetration depth of a specified object with a predetermined penetration force and/or the reflection of sound waves, in particular ultrasound waves, on the curable material. In particular, it is a penetrometer for carrying out a penetration needle measuring process and/or an ultrasound measuring cell.

The ultrasound measuring cell is configured in particular as described above in connection with the method or in the publication "Kontinuierliche Messung der Festigkeitsentwicklung von Spritzbeton" ["Continuous measurement of the strength development of shotcrete"] by Oblak et al., Shotcrete Conference 2012 (publisher: Prof. Wolfgang Kusterle) in chapter 3. In particular, the ultrasound measuring cell comprises a measuring sensor that can generate ultrasound pulses in the range of 0.1 to 10 MHz, a waveguide and/or a temperature sensor.

Moreover, the device according to the invention comprises in particular a conveying device, in particular a pump, by means of which the curable material can be conveyed via a line to the print head. The control unit is advantageously configured such that the delivery rate of the conveying device can be controlled.

It can further be advantageous for the device according to the invention to have at least one flow measuring device by means of which the rate of a volume flow conveyed through the print head can be measured. Here, the control unit is configured in particular such that the measured volume flow rate can be determined and in particular taken into consideration in controlling the print head and/or the conveying device for the curable material.

In an advantageous embodiment, the print head has a valve by means of which an outlet opening of the print head can be opened and closed. In particular, this can occur continuously. The valve is advantageously controllable by means of the control unit. This allows fine metering of the volume flow rate of curable material, which is applied by means of the print head.

It can further be advantageous if the print head comprises in the area of the outlet at least one metering device, in particular two metering devices, for admixing at least one additive with the curable material. Preferably, the print head additionally comprises a mixing device, by means of which the additive or the additives and the curable material can be mixed before exiting the print head.

The at least one additive can for example be conveyed via one or a plurality of further conveying devices, e.g. further pumps, and conveying lines to the metering devices. The further conveying devices are in particular controllable via the control unit, in particular independently of one another.

The print head is equipped in particular with at least one outlet nozzle through which the curable material can be discharged. In a preferred variant, the print head is moveable in one, two or three spatial directions. Particularly preferred are print heads that are moveable in three spatial directions. This makes it possible in a particularly simple manner to produce shaped bodies of virtually any desired form.

The movement of the print head can e.g. be implemented in that the print head is mounted on a conventional robot arm that is moveable in one, two or three spatial directions.

It is also possible to implement movements in one, two or three spatial directions by means of corresponding movements of the build space area. Here, the build space area is the area, for example a surface, on which the shaped body is built up.

In the case of a print head that is moveable in two spatial directions, a possibly desired movement in the third spatial direction can be implemented e.g. by means of a build space area that can be raised and/or lowered.

The robot arm and/or the build space area can be controlled in particular via the control unit.

In a further aspect, the invention relates to the use of a device as described above in the second aspect for producing shaped bodies from mineral binders or mineral binder compositions, in particular concrete and/or mortar compositions. These are in particular finished parts for structures, e.g. for a building, a masonry structure and/or a bridge.

The following exemplary embodiments further clarify the invention.

BRIEF DESCRIPTION OF THE FIGURES

The figures used to illustrate the exemplary embodiments show the following.

EXEMPLARY EMBODIMENT

Figure 1:
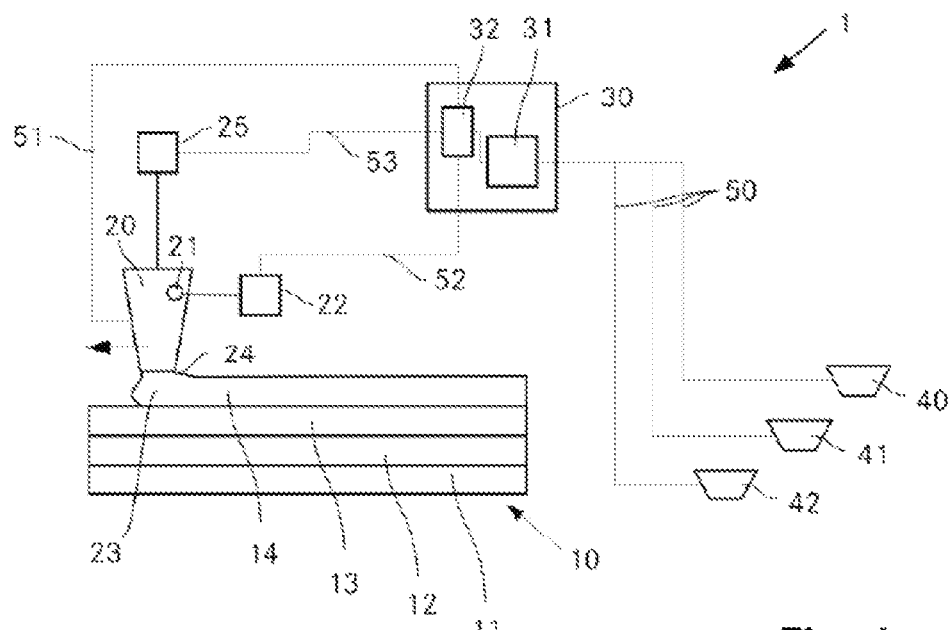
FIG. 1 a schematic diagram of a device for the additive manufacturing of a shaped body from a curable material.

FIG. 1 shows a schematic view of a device 1 according to the invention for producing a shaped body 10 from a curable material 23 during the manufacturing process.

The curable material 23, in this case a conventional cementitious mortar composition, is discharged by means of a print head 20 that is moveable in all three spatial directions by means of a robot arm that is not shown. In the situation shown in FIG. 1, the print head 20 is moving to the left, which is indicated by the arrow on the print head 20. In FIG. 1, three complete layers 11, 12, 13 lying on top of one another have already been built up using the print head 20. The fourth layer 14 is still under construction in FIG. 1.

The print head 20 is supplied via a pump 25 and a supply line with curable material 23, which exits through the nozzle opening 24 on the end side of the print head 20. A metering device 21 is also arranged on the print head for a curing accelerator that is supplied via a further pump 22 and an accompanying line. The curing accelerator can in principle be any desired substance suitable for cementitious mortar compositions.

The print head 20 and the two pumps 22, 25 are connected via data lines 51, 52, 53 to a control unit 30. The control unit 30 can emit via a calculation and output unit 32 electrical signals for controlling the movement of the print head 20 and the supply rates of the two pumps 22, 25.

The device 1 according to the invention in FIG. 1 further comprises on the right-hand side three measuring cells 40, 41, 42. These are configured as ultrasound measuring cells as described in the publication "Kontinuierliche Messung der Festigkeitsentwicklung von Spritzbeton" ["Continuous measurement of the strength development of shotcrete"] by Oblak et al., Shotcrete Conference 2012 (publisher: Prof. Wolfgang Kusterle) in chapter 3.

The print head 20 can release material samples of the curable material 23 into the measuring cells 40, 41, 42 during the production process in order to determine the strength development of the curable material 23. The data or reflection properties determined in this process are transmitted via data lines 50 to the control unit 30, where they can be stored in a memory area 31.

The control unit 30 is configured such that by means of the determined data or the temporal strength development values, the operating parameters of the device 1 can be adapted, so that for example a preselected application rate of the curable material 23 can be maintained. Corresponding parameters can be stored in the memory unit 31 (also see description of FIG. 2 below).

Specifically, during operation with a constant conveyed amount of the curable material, one can for example coordinate the movement speed of the print head 20 with the temporal strength development. The print head can for example be controlled in such a manner that on movement from right to left, curable material is discharged, and on movement from left to right, the discharge is paused. This allows the print head 20 to build up each new layer in the plane from the same starting point. In this process, for example, the speed of traveling back from left to right can be reduced, or a waiting time can be observed at the starting point for the production of a further layer in order to ensure the required strength of the curable material, before a further layer is applied.

The temporal strength development of the curable material 23 can take place for example before application of the first layer 11 in measuring cells 40. If a specified application rate is to be achieved, the control unit 30 automatically sets suitable parameters as a function of the strength development and any required calibration data stored in the memory unit 31, e.g. the movement speed of the print head 20 and the amount of curable material conveyed.

After application of the first layer 11, the temporal strength development of the curable material 23 can again be determined, e.g. in a measuring cell 41. Should deviations occur, these can be compensated for.

Figure 2:
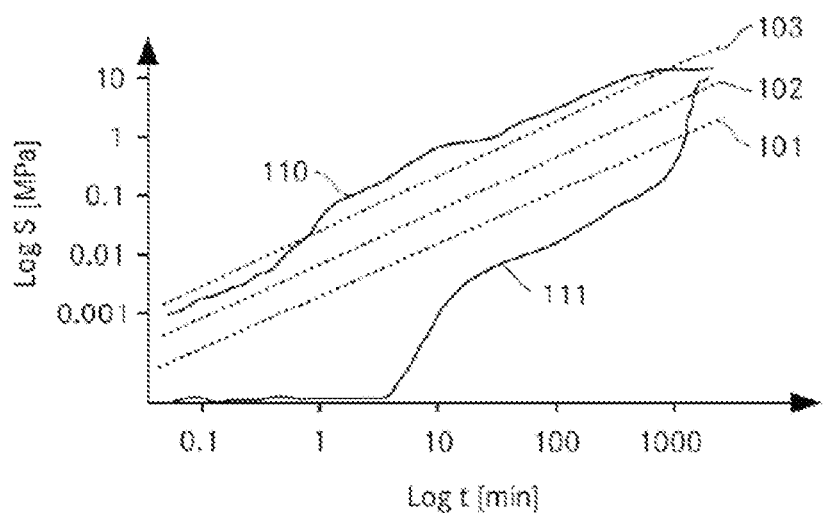
FIG. 2 a diagram of the required temporal strength development values for producing shaped bodies at various application rates (dotted lines) and measured temporal strength development values of mineral binder compositions with and without admixture of curing accelerators (solid lines)

FIG. 2 shows the temporal strength development values 101, 102, 103 of the curable material 23 required for a specified application rate. "S" denotes the compressive strength of the curable material, while "t" corresponds to the time after exiting the print head 20. The temporal strength development values 101, 102, 103 can be stored in the memory area 31 of the control unit 30 of FIG. 1. The first temporal strength development 101 corresponds to an application rate of 1 m per 5 min. The second temporal strength development 102 corresponds to an application rate of 1 m per 2.5 min, and the third temporal strength development 103 corresponds to an application rate of 1 m per 1 min. The application rate is equivalent to the height of the shaped body 10 built per unit time.

The curve 110 represents the temporal strength development of the curable material measured with an ultrasound measuring cell 40 after exiting the print head 20. It can be seen that the temporal strength development remains above the required temporal strength development 101 for an application rate of 1 m per 2.5 min. This allows such an application rate to be implemented without problems.

The curve 111 represents a comparative test, in which no curing accelerator was added. It can be seen that in this case, even an application rate of 1 m per 5 min (required strength development 101) could not be achieved without impairing the quality of the shaped body.

Figure 3:
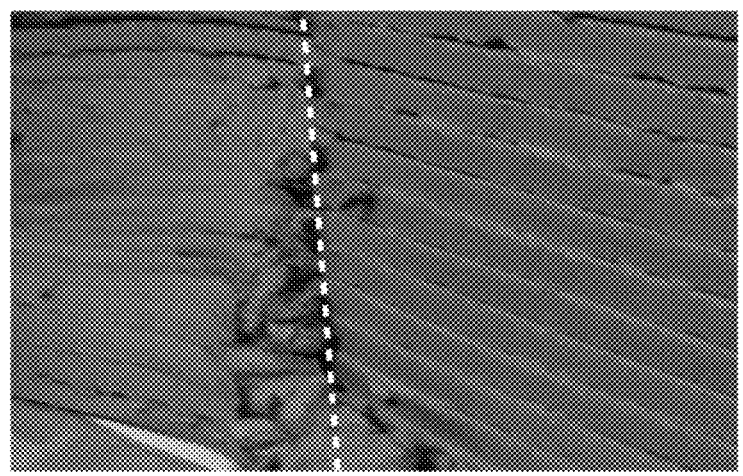
FIG. 3 on the right-hand side, a shaped body produced by the method according to the invention, and on the left-hand side, a shaped body produced by a conventional method without taking into consideration the temporal strength development.

On the right-hand side in FIG. 3, a section of a shaped body approx. 1 m in height that was produced by the method according to the invention from a mortar composition is shown. It can be seen clearly that all of the layers, each of which has a height of approx. 1.5 cm, show constant thickness and uniform shape.

In contrast, the shaped body shown on the left-hand side, which was produced without taking the temporal strength development into consideration, shows significant deformations and uneven thicknesses of the individual sheets. This was a case either of an excessively high application rate or excessively low strength development.

However, the above-described embodiment is to be understood solely as an illustrative example that can be modified as desired within the context of the invention.

For example, instead of the ultrasound measuring cells 40, 41, 42, other measuring cells can be provided that carry out an automated penetration needle process. Fewer than three or more than three measuring cells can also be provided.

Moreover, an additional metering device can be provided by means of which e.g. a retardant substance can be admixed instead of or in addition to the curing accelerator in the print head 20.

In addition to or instead of the metering device 21, a device for adding the curing accelerator directly in the area of the pump 25 can also be provided on the print head. The amount of the curing accelerator added can then be measured e.g. using a flow sensor.

In principle, moreover, another curable material can be used, for example comprising organic binders.

The invention claimed is:

1. A method for producing a shaped body from a curable material, the method comprising:
    applying the curable material in layers by an additive method using a print head that is moveable in at least one spatial direction;
    measuring at least one of an application rate of the curable material and a temporal strength development of the curable material; and
    adjusting at least one of (i) the application rate of the curable material depending on the measured temporal strength development of the curable material, and (ii) the temporal strength development of the curable material depending on the measured application rate of the curable material,
    wherein the temporal strength development of the curable material is a compressive strength of the curable material at a specified point in time at least one of after mixing of the curable material and after the exit of the curable material from the print head.

2. The method as claimed in claim 1, wherein the application rate of the curable material changes as the number of layers increases.

3. The method as claimed in claim 1, wherein a waiting time is observed between the application of two successive layers of curable material, and the waiting time is selected depending on the temporal strength development of the curable material.

4. The method as claimed in claim 1, wherein a movement speed of the print head is set depending on the temporal strength development of the curable material.

5. The method as claimed in claim 1, wherein the movement speed of the print head is set depending on a length of a distance the print head has to travel in a current layer of the shaped body with release of curable material.

6. The method as claimed in claim 1, wherein the temporal strength development is determined by measurement of a physical quantity of the curable material at least one time, and the measurement of the physical quantity of the curable material takes place at the at least one specified point in time.

7. The method as claimed in claim 6, wherein, as a physical quantity, at least one selected from the group consisting of a temperature, an electrical conductivity, a penetration force of a specified object with a predetermined penetration depth, a penetration depth of a specified object with a predetermined penetration force, and a reflection of sound waves is measured on the curable material.

8. The method as claimed in claim 1, wherein the temporal strength development is measured by at least one of a penetration needle method and a sound measurement.

9. The method as claimed in claim 1, wherein the curable material is treated with at least one of an agent that accelerates the curing and an agent that retards the curing.

10. The method as claimed in claim 9, wherein the curable material in the area of the print head is admixed with at least one of a substance that accelerates the curing and a substance that retards the curing.

11. The method as claimed in claim 1, wherein the curable material comprises a mineral binder composition.

12. The method as claimed in claim 1, wherein the curable material consists of a mineral binder composition.

13. The method as claimed in claim 1, wherein the specified point in time is in a range of 0.1 to 1,000 minutes.

14. The method as claimed in claim 1, wherein the specified point in time is in a range of 0.1 to 100 minutes.

15. The method as claimed in claim 1, wherein the specified point in time is in a range of 0.1 to 10 minutes.

16. The method as claimed in claim 1, wherein the application rate of the curable material and the temporal strength development of the curable material are synchronized with each other.

17. The method as claimed in claim 1, wherein the application rate of the curable material and the temporal strength development of the curable material are measured, and the application rate of the curable material is adjusted depending on the measured temporal strength development of the curable material, and the temporal strength development of the curable material is adjusted depending on the measured application rate of the curable material.

* * * * *